(12) United States Patent
Rusanovskyy et al.

(10) Patent No.: US 11,528,504 B2
(45) Date of Patent: Dec. 13, 2022

(54) MOTION VECTOR PREDICTION WITH MOTION INFORMATION COLLECTING BUFFER

(71) Applicant: QUALCOMM Incorporated, San Diego, CA (US)

(72) Inventors: Dmytro Rusanovskyy, San Diego, CA (US); Yan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/924,884

(22) Filed: Jul. 9, 2020

(65) Prior Publication Data

US 2021/0014524 A1 Jan. 14, 2021

Related U.S. Application Data

(60) Provisional application No. 62/873,661, filed on Jul. 12, 2019, provisional application No. 62/873,162, filed on Jul. 11, 2019.

(51) Int. Cl.
*H04N 19/52* (2014.01)
*H04N 19/176* (2014.01)
*H04N 19/59* (2014.01)

(52) U.S. Cl.
CPC .......... *H04N 19/52* (2014.11); *H04N 19/176* (2014.11); *H04N 19/59* (2014.11)

(58) Field of Classification Search
CPC ...... H04N 19/52; H04N 19/176; H04N 19/59; H04N 19/105; H04N 19/167; H04N 19/157
USPC ................................... 375/240.16
See application file for complete search history.

(56) References Cited

U.S. PATENT DOCUMENTS

| | | | |
|---|---|---|---|
| 10,070,130 B2* | 9/2018 | Rapaka | H04N 19/593 |
| 11,012,687 B2* | 5/2021 | Li | H04N 19/176 |
| 2014/0205014 A1* | 7/2014 | Nakamura | H04N 19/577 |
| | | | 375/240.16 |

(Continued)

FOREIGN PATENT DOCUMENTS

WO 2017076221 A1 5/2017

OTHER PUBLICATIONS

Bossen F., et al., "Guidelines for VVC Reference Software Development", Joint Video Experts Team (JVET) of ITU-T SG16 WP3 and ISO/IEC JTC1/SC29/WG11, 14th Meeting: Geneva, CH, Mar. 19-27, 2019, JVET-N1003, pp. 1-8.

(Continued)

*Primary Examiner* — Talha M Nawaz
(74) *Attorney, Agent, or Firm* — Shumaker & Sieffert, P.A.

(57) ABSTRACT

An example device for coding video data includes a memory configured to store video data; and one or more processors implemented in circuitry and configured to: determine that a size of a current block of the video data is less than a threshold, the current block being a two-dimensional array of samples representing a portion of a picture; determine a set of motion vector prediction candidates for the current block according to the determination that the size of the current block is less than the threshold; select a motion vector predictor of the motion vector prediction candidates for the current block; code motion information of the current block using the motion vector predictor; and code the current block using the motion information.

30 Claims, 11 Drawing Sheets

(56) References Cited

U.S. PATENT DOCUMENTS

| | | | | |
|---|---|---|---|---|
| 2016/0021387 A1* | 1/2016 | Chuang | ............... | H04N 19/593 |
| | | | | 375/240.16 |
| 2016/0100171 A1* | 4/2016 | Karczewicz | .......... | H04N 19/70 |
| | | | | 375/240.02 |
| 2018/0077426 A1* | 3/2018 | Zhang | .................. | H04N 19/117 |
| 2019/0222834 A1* | 7/2019 | Chen | ................... | H04N 19/105 |
| 2020/0236386 A1* | 7/2020 | Takehara | ............. | H04N 19/172 |
| 2020/0280734 A1* | 9/2020 | Takehara | ............. | H04N 19/105 |
| 2021/0274168 A1* | 9/2021 | Solovyev | ............. | H04N 19/119 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, 7th Meeting, Jul. 13, 2017-Jul. 21, 2017, Torino, Aug. 19, 2017 (Aug. 19, 2017), XP030150980, 51 Pages, pp. i-iv, Retrieved from the Internet: URL: http://phenix.int-evry.fr/jvet/doc_end_user/documents/7_Torino/wg11/JVET-G0001-v1.zip.

Choi K., et al., "Text of ISO/IEC CD 23094-1, Essential Video Coding", Coding of Moving Pictures and Audio, Jul. 2019, Gothenburg, Sweden, ISO/IEC JTC1/SC29/WG11 N18568, ISO/IEC CD 23094-1, Jul. 2019, 292 Pages.

Han (Qualcomm) Y., et al., "CE4: Modification on History-Based Motion Vector Prediction", 13th JVET Meeting, Jan. 9, 2019-Jan. 18, 2019, Marrakech, (The Joint Video Exploration Team of ISO/IEC JTC1/SC29/WG11 and ITU-T SG.16), No. JVET-M0126, Jan. 14, 2019 (Jan. 14, 2019), XP030202536, 9 Pages, Retrieved from the Internet: URL: http://phenix.int-evry.fr/jvet/doc_end_user/documents/13_Marrakech/wg11/JVET-M0126-v6.zip JVET-M0126_r4.docx [retrieved on Jan. 14, 2019].

"Information Technology—General Video Coding—Part 1: Essential Video Coding", ISO/IEC FDIS 23094-1, ISO/IEC JTC1/SC 29/WG 11, 2020, 354 Pages.

International Search Report and Written Opinion—PCT/US2020/041671—ISA/EPO—dated Sep. 28, 2020.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Video: "Test Model of Essential Video Coding (ETM 3.0)", Coding of Moving Pictures and Audio, ISO/IEC JTC 1/SC 29/WG 11, N18569, Gothenburg, SE, Jul. 2019, 24 Pages.

Yu (Ericsson) R., et al., "CE 4-2.1: Adding Non-Adjacent Spatial Merge Candidates", JVET-K0228-v1, 11th JVET Meeting, Jul. 11, 2018-Jul. 18, 2018, Ljubljana, (The Joint Video Exploration Team of ISO/IEC JTC1/SC29/WG11 and ITU-T SG.16 ), No. JVET-K0228, Jul. 2, 2018 (Jul. 2, 2018), XP030248451, pp. 1-3, Retrieved from the Internet: URL:http://phenix.int-evry.fr/jvet/doc_end_user/documents/11_Ljubljana/wg11/JVET-K0228-v1.zip JVET-K0228-v1.docx [retrieved on Jul. 2, 2018].

Zhang (Bytedance) L., et al., "CE4-related: History-Based Motion Vector Prediction", JVET-K0104-v4, 11th JVET Meeting, Jul. 11, 2018-Jul. 18, 2018, Ljubljana, (The Joint Video Exploration Team of ISO/IEC JTC1/SC29/WG11 and ITU-T SG.16), No. JVET-K0104, Jul. 18, 2018 (Jul. 18, 2018), XP030200018, 6 pages, Retrieved from the Internet: URL: http://phenix.int-evry.fr/jvet/doc_end_user/documents/11_Ljubljana/wg11/JVET-K0104-v5.zip JVET-K0104_r3.docx [retrieved on Jul. 18, 2018].

* cited by examiner

MOTION VECTOR PREDICTION WITH MOTION INFORMATION COLLECTING BUFFER

This application claims the benefit of U.S. Provisional Application No. 62/873,162, filed Jul. 11, 2019, and U.S. Provisional Application No. 62/873,661, filed Jul. 12, 2019, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to decoder-side motion vector refinement (DMVR). These techniques may be applied to any of the existing video codecs, such as HEVC (High Efficiency Video Coding), or upcoming VVC (Versatile Video Coding). These techniques may also provide efficient coding tools for future video coding standards.

In one example, a method of coding video data includes determining that a size of a current block of the video data is less than a threshold, the current block being a two-dimensional array of samples representing a portion of a picture; determining a set of motion vector prediction candidates for the current block according to the determination that the size of the current block is less than the threshold; selecting a motion vector predictor of the motion vector prediction candidates for the current block; coding motion information of the current block using the motion vector predictor; and coding the current block using the motion information.

In another example, a device for coding video data includes a memory configured to store video data; and one or more processors implemented in circuitry and configured to: determine that a size of a current block of the video data is less than a threshold, the current block being a two-dimensional array of samples representing a portion of a picture; determine a set of motion vector prediction candidates for the current block according to the determination that the size of the current block is less than the threshold; select a motion vector predictor of the motion vector prediction candidates for the current block; code motion information of the current block using the motion vector predictor; and code the current block using the motion information.

In another example, a computer-readable storage medium has stored thereon instructions that, when executed, cause a processor to: determine that a size of a current block of video data is less than a threshold, the current block being a two-dimensional array of samples representing a portion of a picture; determine a set of motion vector prediction candidates for the current block according to the determination that the size of the current block is less than the threshold; select a motion vector predictor of the motion vector prediction candidates for the current block; code motion information of the current block using the motion vector predictor; and code the current block using the motion information.

In another example, a device for coding video data includes means for determining that a size of a current block of the video data is less than a threshold, the current block being a two-dimensional array of samples representing a portion of a picture; means for determining a set of motion vector prediction candidates for the current block according to the determination that the size of the current block is less than the threshold; means for selecting a motion vector predictor of the motion vector prediction candidates for the current block; means for coding motion information of the current block using the motion vector predictor; and means for coding the current block using the motion information.

The details of one or more examples are set forth in the accompanying drawings and the description below. Other features, objects, and advantages will be apparent from the description, drawings, and claims.

DETAILED DESCRIPTION

Figure 1:
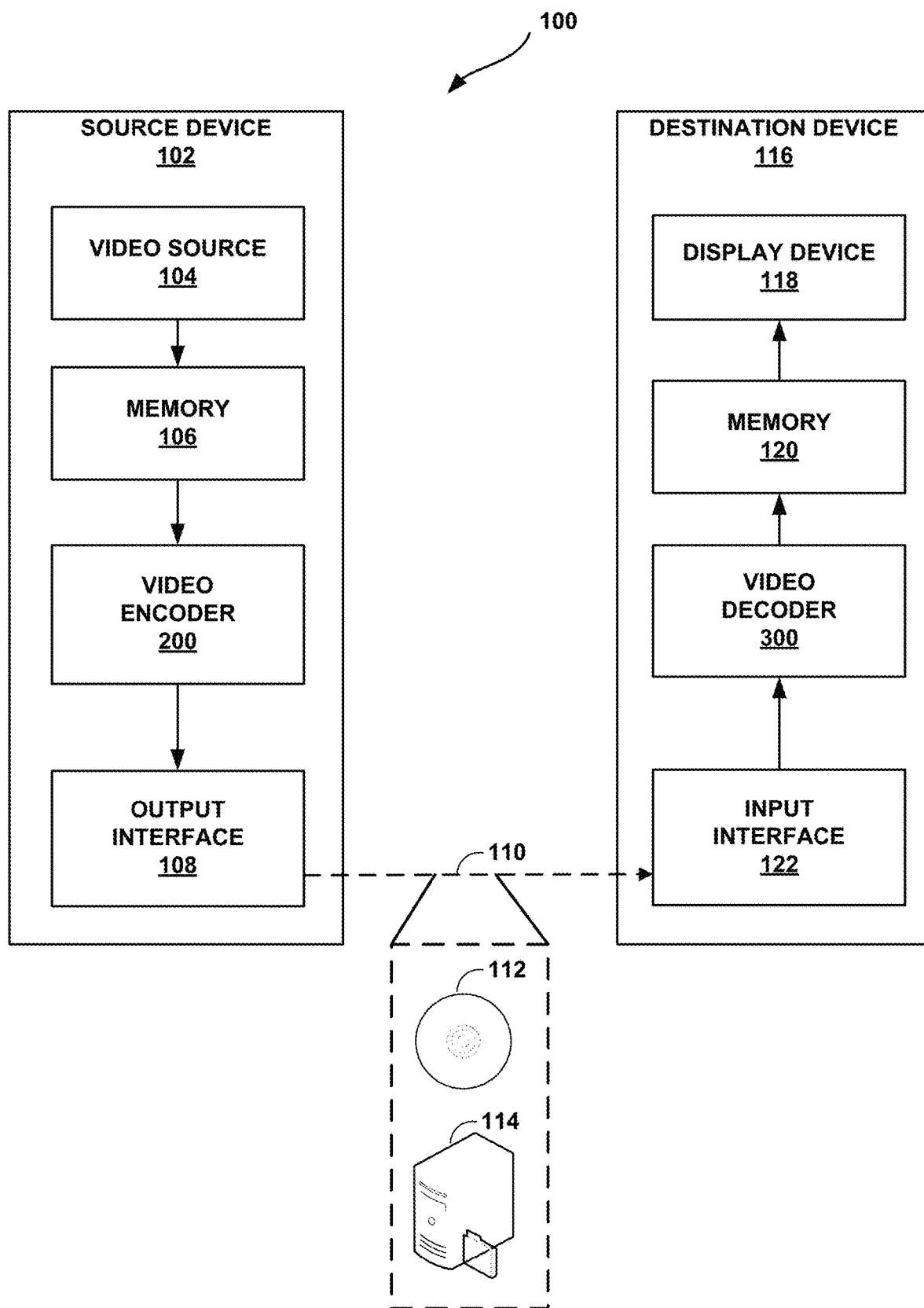
FIG. 1 is a block diagram illustrating an example video encoding and decoding system that may perform the techniques of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, High Efficiency Video Coding (HEVC) or ITU-T H.265, including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification, referred to as "HEVC WD" hereinafter, is available from phenix.int-evey.fr/jct/doc_end_user/documents/14_Vienna/wg11aCTVC-N1003-v1.zip.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 7 (JEM 7) is available from jvet.hhi.fraunhofer.de/svn/svn HMJEMSoftware/tags/HM-16.6-JEM-7.0/. A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, 19-27 Mar. 2019, JVET-N1001-v3 (hereinafter "VVC Draft 5"). The techniques of this disclosure, however, are not limited to any particular coding standard.

In HEVC, the largest coding unit in a slice is called a coding tree block (CTB) or coding tree unit (CTU). A CTB contains a quad-tree, the nodes of which are coding units. The size of a CTB, per HEVC, ranges from 16×16 to 64×64 in the HEVC main profile (although technically 8×8 CTB sizes can be supported). A coding unit (CU) could be the same size of a CTB to as small as 8×8, per HEVC. Each coding unit is coded with one prediction mode, i.e., inter or intra. When a CU is inter coded, it may be further partitioned into 2 or 4 prediction units (PUs), or become just one PU when further partition does not apply. When two PUs are present in one CU, they can be half size rectangles or two rectangles with sizes of ¼ and ¾ of the CU, respectively. When the CU is inter coded, each PU has one set of motion information, which may be derived with a unique inter prediction mode.

In HEVC, there are two inter prediction modes, named merge mode (skip is considered as a special case of merge mode) and advanced motion vector prediction (AMVP) mode, respectively, for a prediction unit (PU). In either AMVP mode or merge mode, a video coder maintains a motion vector (MV) candidate list for multiple motion vector predictors. The video coder generates the motion vector(s), as well as reference indices in the merge mode, of the current PU by taking one candidate from the MV candidate list.

According to HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current blocks, as well as the associated motion vectors are determined. On the other hand, under AMVP mode for each potential prediction direction from either list 0 or list 1, a reference index is explicitly signaled, together with an MV predictor (MVP) index to the MV candidate list since the AMVP candidate contains only a motion vector. In AMVP mode, the predicted motion vectors can be further refined. The candidates for both modes are derived similarly from the same spatial and temporal neighboring blocks.

Retrieving motion information of neighboring blocks to a current block to predict motion information of the current block can be costly, in terms of number of processor operations performed and in terms of using memory bandwidth. This disclosure recognizes that for small block sizes, e.g., 4×4, 4×8, or 8×4, this number of operations can be significant, especially when compounded by many small blocks in a slice or picture. Thus, according to the techniques of this disclosure, a video coder may use a reduced number of motion information candidates to predict motion information of a small sized block, relative to numbers of motion information candidates for larger blocks. By reducing the number of candidates for small blocks, fewer operations can be performed and memory bandwidth can be improved, thereby improving performance of a video coder, without negatively impacting bitrate of an encoded video bitstream and without negatively impacting video fidelity when video data of the encoded video bitstream is decoded and displayed.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for performing motion vector prediction according to this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for performing motion vector prediction according to this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. The current block may be a two-dimensional array of samples representing a portion of a picture. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In particular, when encoding motion information, such as motion vectors, video encoder 200 may predict the motion vectors from motion vector prediction candidates. Such motion vector prediction candidates may be selected from one or more neighboring blocks to a current block. In general, HEVC and VVC indicate a certain set of neighboring blocks to the current block from which to select the motion vector prediction candidates. In accordance with the techniques of this disclosure, however, video encoder 200 and video decoder 300 may use different numbers of neighboring blocks to a current block from which to select motion vector prediction candidates based on a size of the current block.

For example, if the current block has a size greater than a threshold, video encoder 200 and video decoder 300 may select the motion vector prediction candidates from a first number of neighboring blocks, whereas if the current block has a size less than the threshold, video encoder 200 and video decoder 300 may select the motion vector prediction candidates from a second number of neighboring blocks, the second number being less than the first number. For example, when the current block has a size less than 8×8, video encoder 200 and video decoder 300 may select the motion vector prediction candidates from up to 15 neighboring blocks, whereas if the current block has a size that is greater than or equal to 8×8, video encoder 200 and video decoder 300 may select the motion vector prediction candidates from up to 23 neighboring blocks.

In some examples, the neighboring blocks to the current block may be spatial neighboring blocks. In order to ensure that the checked neighboring blocks are spaced apart from each other, video encoder 200 and video decoder 300 may skip checking different numbers of spatial neighboring blocks for use as motion vector prediction candidates based on a size of the current block. For example, when the current block has a size less than 8×8, video encoder 200 and video decoder 300 may use a first skip value number larger than 4, whereas if the current block has a size that is greater than or equal to 8×8, video encoder 200 and video decoder 300 may use a second skip value number of 4. Thus, the skip number may be larger for smaller blocks than for larger blocks. In particular, video encoder 200 and video decoder 300 may subsample history buffer information according to the skip offset. Likewise, video encoder 200 and video decoder 300 may determine the set of motion vector prediction candidates from a motion information buffer produced from a source other than a current picture including the current block. The source may be, for example, a picture other than the current picture, a different resolution level, a different view, a different slice, a different tile, or a different fragment.

After constructing the set of motion vector predictors, video encoder 200 may determine one of the motion vector predictors that most accurately represents a motion vector for the current block. Video encoder 200 may encode an index identifying the motion vector prediction candidate including the motion vector predictor that most accurately represents the motion vector for the current block. If video encoder 200 encodes the motion information in AMVP mode, video encoder 200 may further encode motion vector difference information and other motion information, such as a reference picture list indicator and a reference picture index. Video decoder 300 may decode such information to determine the motion vector predictor and reconstruct the motion information for the current block.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2B:
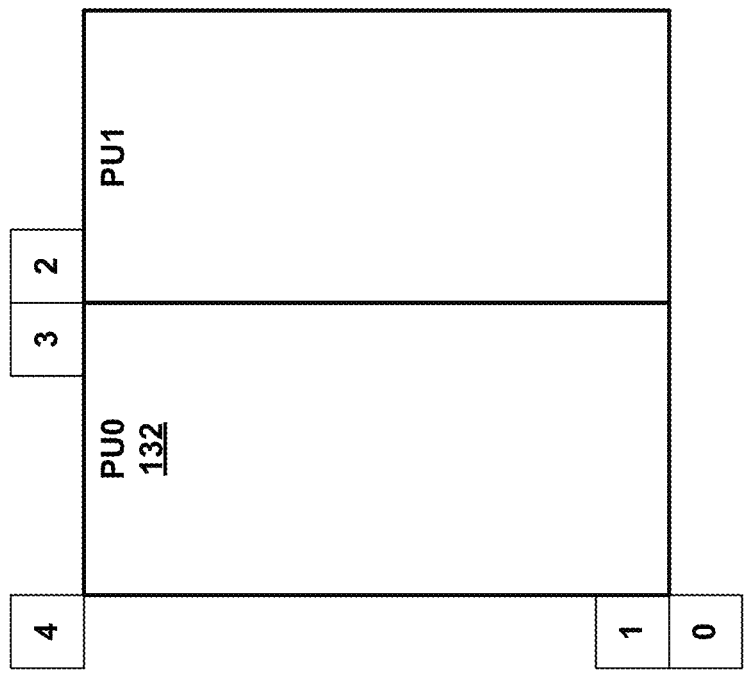
FIGS. 2A and 2B are conceptual diagrams illustrating examples of spatial neighboring motion vector (MV) candidates for merge mode and advanced motion vector prediction (AMVP) mode.
Figure 2A:
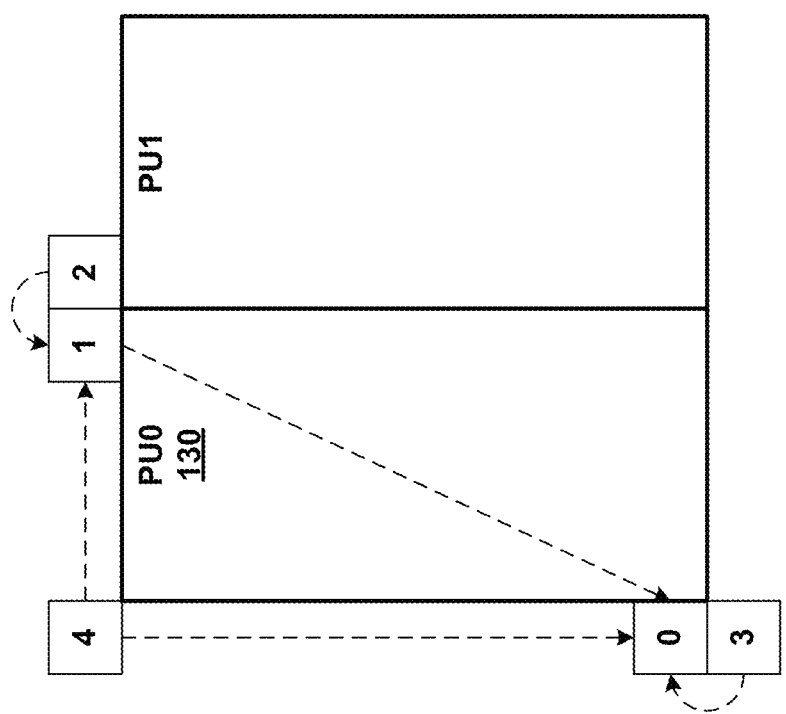

FIGS. 2A and 2B are conceptual diagrams illustrating examples of spatial neighboring motion vector (MV) candidates for merge mode and advanced motion vector prediction (AMVP) mode. In the example of FIG. 2A, spatial MV candidates for PU0 130 are shown, while in the example of FIG. 2B, spatial MV candidates for PU0 132 are shown. In particular, FIG. 2A illustrates candidates for PU0 130 for merge mode, while FIG. 2B illustrates candidates PU0 132 for AMVP mode. In HEVC, spatial MV candidates are derived from the neighboring blocks shown in FIGS. 2A and 2B, for a specific PU (PU0), although the techniques for generating the candidates from the blocks differ for merge and AMVP modes.

In merge mode, up to four spatial MV candidates can be derived for PU0 130 with the orders shown in FIG. 2A with numbers, and the order is the following, per HEVC: left (0, A1), above (1, B1), above right (2, B0), below left (3, A0), and above left (4, B2), as shown in FIG. 2A.

In AVMP mode, per HEVC, the neighboring blocks to PU0 132 are divided into two groups: a left group including blocks 0 and 1, and an above group including blocks 2, 3, and 4, as shown FIG. 2B. For each group, the potential candidate in a neighboring block to PU0 132 referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3B:
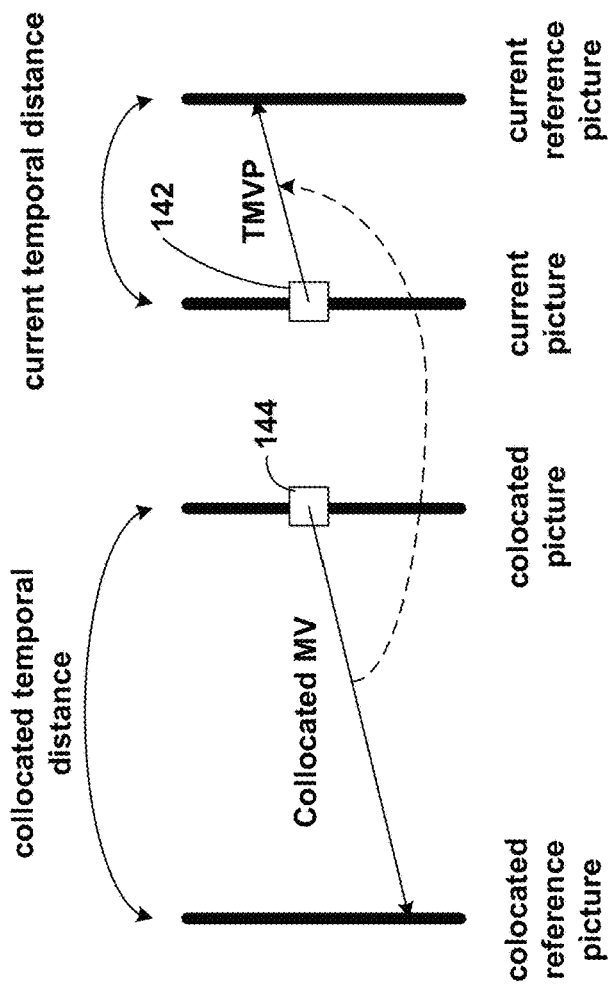
FIGS. 3A and 3B are conceptual diagrams examples of temporal motion vector prediction (TMVP) candidates and scaling MVs for TMVP candidates.
Figure 3A:
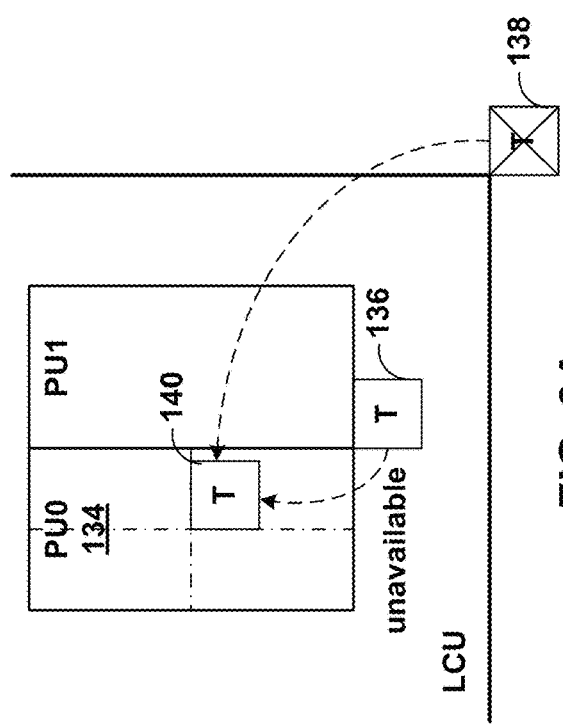

FIGS. 3A and 3B are conceptual diagrams examples of temporal motion vector prediction (TMVP) candidates and scaling MVs for TMVP candidates. In particular, FIG. 3A illustrates example locations of TMVP candidates for PU0 134, while FIG. 3B illustrates techniques related to scaling motion vectors of TMVP candidates.

In HEVC, a TMVP candidate, if enabled and available, is added into the MV candidate list after spatial motion vector candidates. The process of motion vector derivation for TMVP candidate is the same for both merge and AMVP modes. However, the target reference index for the TMVP candidate in the merge mode is always set to 0, per HEVC.

The primary block location for TMVP candidate derivation is the bottom right block outside of the collocated PU, as shown in FIG. 3A as a block "T" 136, to compensate for the bias to the above and left blocks used to generate spatial neighboring candidates. However, if that block is located outside of the current CTB row or motion information for that block is not available (e.g., as shown with block T 138), that block is substituted with a center block of the PU, i.e., block T 140.

A video coder may derive a motion vector for the TMVP candidate of current PU 142 from co-located PU 144 of a co-located picture, indicated in the slice level. The motion vector for co-located PU 144 is called the collocated MV. Similar to temporal direct mode in AVC, to derive the TMVP candidate motion vector, the co-located MV needs to be scaled to compensate the temporal distance differences, as shown in FIG. 3B.

It is assumed that the value of motion vectors is proportional to the distance of pictures in the presentation time. A motion vector associates two pictures: the reference picture and the picture containing the motion vector (namely the containing picture). When a motion vector is used to predict another motion vector, the distance of the containing picture and the reference picture is calculated based on the Picture Order Count (POC) values. For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

If a motion vector candidate list is not complete, artificial motion vector candidates may be generated and inserted at the end of the list until it has all needed candidates. In merge mode of HEVC, there are two types of artificial MV candidates: combined candidates, derived only for B-slices, and zero candidates, used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Candidates from different blocks may happen to be the same, which decreases the efficiency of a merge/AMVP candidate list. Per HEVC, a pruning process is applied to solve this problem. According to the pruning process, a video coder compares one candidate against the others in the current candidate list to avoid inserting identical candidates, to a certain extent. To reduce the complexity, only limited numbers of pruning processes are applied, instead of comparing each potential candidate with all the other existing candidates.

Figure 4:
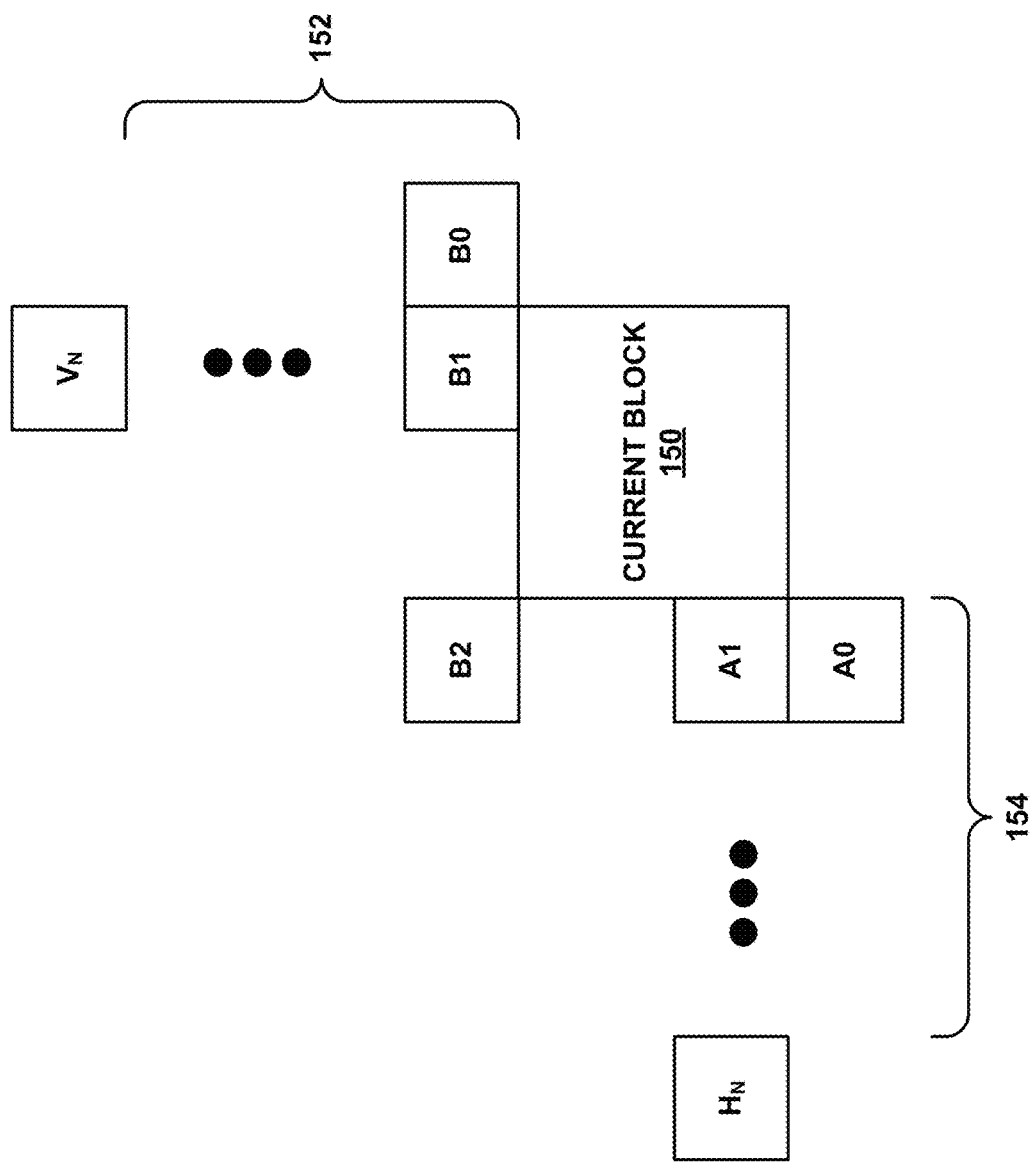
FIG. 4 is a conceptual diagram illustrating an example process by which non-adjacent spatial merge candidates can be fetched.

FIG. 4 is a conceptual diagram illustrating an example process by which non-adjacent spatial merge candidates can be fetched. In particular, video encoder 200 or video decoder 300 may fetch non-adjacent blocks to current block 150, where the non-adjacent blocks include, for example, blocks $V_N$ and $H_N$, and other blocks (represented by ellipses in FIG. 4) between blocks $A_J$ to $H_N$ and $B_K$ to $V_N$. In VVC, there are several inter coding tools which derive or refine the candidate list of motion vector prediction or merge prediction for current block.

History-based motion vector prediction (HMVP) (described in Zhang et al., "CE4-realted: History-based Motion Vector Prediction," Joint Video Exploration Team of ITU-T SG 16 WP 3 and ISO/IEC JTC 1/SC 29/WG 11, July 2018, document WET-K0104) is a history-based method that allows a video coder to find an MV predictor for each block from a list of MVs decoded from the past, in addition to those in immediately adjacent causal neighboring motion fields. A table with multiple HMVP candidates is maintained during the encoding/decoding process. The table is emptied when a new slice is encountered. Whenever there is an inter-coded block, the associated motion information is inserted to the table in a first-in-first-out (FIFO) fashion as a new HMVP candidate. Then, a FIFO constraint rule can be applied. When inserting a HMVP to the table, a redundancy check is first applied to find whether there is an identical HMVP in the table. If found, that particular HMVP is removed from the table and all the HMVP candidates afterwards are moved.

HMVP candidates could be used in the merge candidate list construction process. Per VVC, all HMVP candidates from the last entry to the first entry in the table are inserted after the TMVP candidate. Pruning is applied on the HMVP candidates. Once the total number of available merge candidates reaches the signaled maximally allowed merge candidates, the merge candidate list construction process may be terminated.

Similarly, HMVP candidates could also be used in the AMVP candidate list construction process. The motion vectors of the last K HMVP candidates in the table may be inserted after the TMVP candidate. HMVP candidates with the same reference picture as the AMVP target reference picture may be used to construct the AMVP candidate list. Pruning may be applied on the HMVP candidates.

The construction of non-adjacent spatial merge candidates (described in Yu, "CE 4-2.1: Adding non-adjacent spatial merge candidates," Joint Video Exploration Team of ITU-T SG 16 WP 3 and ISO/IEC JTC 1/SC 29/WG 11, Jul. 2, 2018, document WET-K0228) involves derivation of new spatial candidates from two non-adjacent neighboring positions (i.e., from the closest non-adjacent block to the left/above, as illustrated in FIG. 4). The blocks are limited to being within a maximum distance of 1 CTU to current block 150. Distance 152 represents an example vertical traced back distance, while distance 154 represents an example horizontal traced back distance. The fetching process of non-adjacent candidates starts with tracing the previously decoded blocks in the vertical direction. The vertical inverse tracing stops when an inter block is encountered or the traced back distance reaches 1 CTU size.

The fetching process then traces the previously decoded blocks in the horizontal direction. The criterion for stopping the horizontal fetching process depends on whether a vertical non-adjacent candidate was successfully fetched or not. If no vertical non-adjacent candidate was fetched, the horizontal fetching process stops when an inter-predicted block is encountered or the traced back distance exceeds one CTU size threshold. If there was a vertical non-adjacent candidate fetched, then the horizontal fetching process stops when an inter-predicted block which contains a different MV from the vertical non-adjacent candidate is encountered or the traced back distance exceeds one CTU size threshold. The fetched non-adjacent neighboring candidates are added before the TMVP candidate in the merge candidate.

Figure 5A:
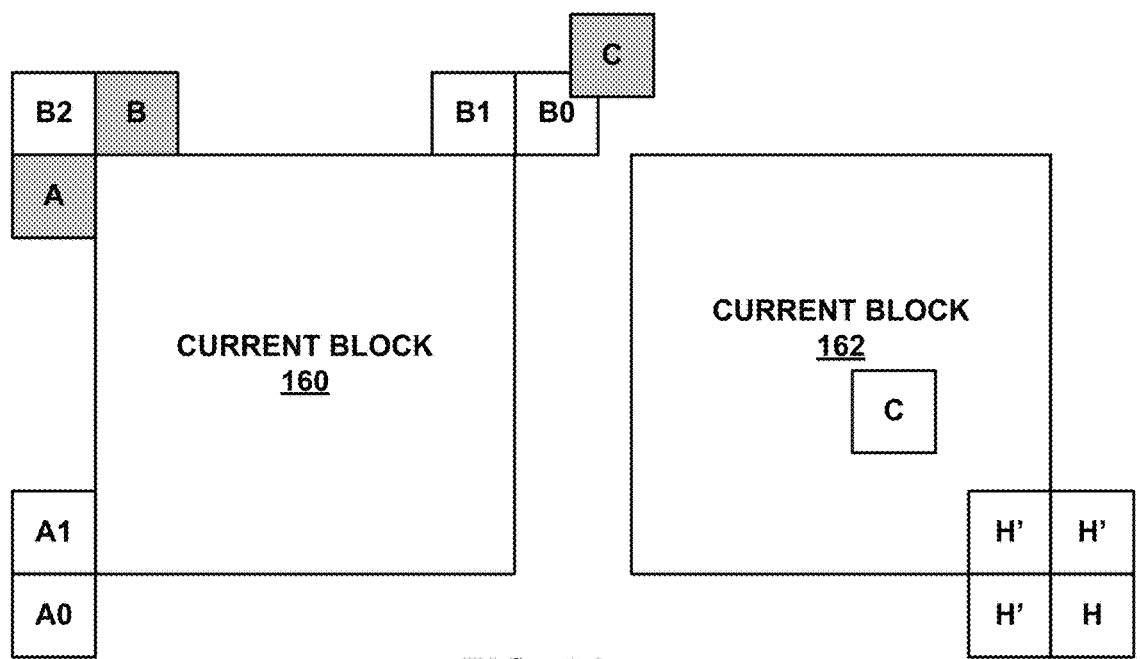
FIGS. 5A-5C are conceptual diagrams illustrating examples of alternative motion vector prediction designs.
Figures 5B, 5C:
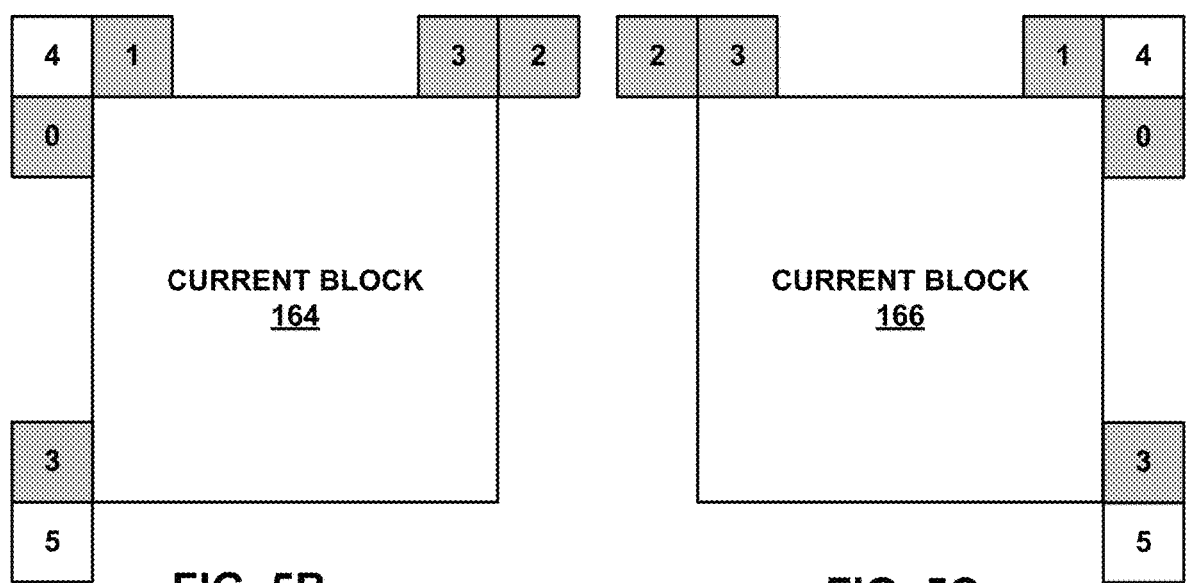

FIGS. 5A-5C are conceptual diagrams illustrating examples of alternative motion vector prediction designs. Such alternative designs for spatial and temporal S/T-MVP prediction can be used, e.g., in accordance with VVC.

For example, in some implementations of merge mode (in some terminologies, this can be called Skip or Direct mode), the following spatial and temporal MVP candidates can be visited in a given order to fill the MVP list. FIG. 5A illustrates an example of MVP candidate locations for current block 160, 162. That is, FIG. 5A illustrates locations of spatial neighboring blocks for current block 160 and locations of temporal neighboring blocks for current block 162, where the neighboring blocks may be used in MV prediction. FIG. 5B illustrates an example visiting order for S-MVP for current block 164. FIG. 5C illustrates an example spatially inverted pattern alternative for current block 166.

Spatial neighbors used as MVP candidates may include blocks A, B, (C, A1|B1), A0, B2. Selection of the neighboring blocks may be performed using a two-stage process, with the visiting order marked in FIG. 5B. In this example:

Group 1 (shown with dark grey shading in FIG. 5B):

A, B, and C (collocated with B0 in HEVC notation)

A1 or B1, depending on availability of MVP in C location and type of block partitioning Group 2 (shown with no shading in FIG. 5B)

A0 and B2

Temporally collocated neighbors utilized as MVP candidates include a block collocated at the center (marked as C with no shading in FIG. 5A) of current block 162 and a block at the most bottom-right location outside of the current block (marked as H in FIG. 5A).

FIG. 5A further illustrates an example Group 3, which includes:

C and H

If H location is found to be outside of the collocated picture, the other H' positions in FIG. 5A may be used instead as fallback positions.

In some implementations, depending on the block partitioning used and coding order, an inverse S-MVP candidates order, as shown in FIG. 5C, can be used instead of the S-MVC candidate order of FIG. 5B.

The history-based MVP techniques of VVC employs the following process, where each motion vector candidate stored in a history buffer of size MAX_HISTORY_BUFFER_SIZE is checked for redundancy against any motion vector candidates already present in the list (MERGE_LIST_ SIZE). This redundancy check introduces certain complexity, which increases with increase size. The problem of worst-case complexity (e.g., MAX_HISTORY_BUFFER_SIZE×MERGE_LIST_SIZE checks) increases with an increase in history buffer size and merge list size. This complexity may multiply with worst case complexity of the small block sizes, e.g., 4×4 or 4×8, or num_samples_in_block<N, where N can take any integer value of some size, e.g., 32.

An example specification defining a HMVP MV check is shown below in italics.

Derivation process for history-based merging candidates
Inputs to this process are:
   a merge candidate list mergeCandList,
   the number of available merging candidates in the list numCurrMergeCand,
   history based motion information table HmvpCandList,
   the maximal number of elements mLSize within mergeCandList.
Outputs to this process are:
   the modified merging candidate list mergeCandList,
   the modified number of merging candidates in the list numCurrMergeCand.
The variable numOrigMergeCand is set equal to numCurrMergeCand. The variable hmvpStop is set to FALSE. The variable NumHmvpCand is set to the number of motion entries in HmvpCandList.
The variable maxNumCheckedHistory is set to be equal to (((NumHmvpCand+1)>>2)<<2)−1.
For each candidate in HmvpCandList with hMvpIdx=0 . . . min(maxNumCheckedHistory, MAX_HISTORY_ BUFFER_SIZE), the following ordered steps are repeated until hmvpStop is equal to TRUE
1. The variable sameMotion is derived as follows:
   sameMotion is set to FALSE
   if HMVPCandList[NumHmvpCand−hMvpIdx] have the same motion vectors and the same reference indices with any mergeCandList[i] with i being 0 . . . numOrigMergeCand−1, sameMotion is set to TRUE
2. When sameMotion is equal to false, the candidate HmvpCandList[NumHmvpCand−hMvpIdx] is added to the merging candidate list as follows:
mergeCandList[numCurrMergeCand++]=HmvpCandList [NumHmvpCand−hMvpIdx] (8-303)
3. If numCurrMergeCand is equal to mLSize, hmvpStop is set to TRUE.

In accordance with the techniques of this disclosure, video encoder 200 and video decoder 300 may be configured to limit the maximum number of checked entries in the history buffer for small block sizes. An example of such a restriction is marked in italics in the specification code below:
1. Number of checked of entries in history buffer is subject of currently processed block size
   a. For smaller block sizes, e.g., size 4×4 or other, video encoder 200 and video decoder 300 may check a smaller number (SIZE_SMALL) of entries from history buffer, as compared to larger block sizes (SIZE_NORMAL). With this restriction, video encoder 200 and video decoder 300 may only check MVPs from a close-area neighborhood.
   b. In yet another example, video encoder 200 and video decoder 300 may modify the skip step (subsampling of history buffer information) per block size, and video encoder 200 and video decoder 300 may employ a larger skip offset for smaller block sizes SKIP_NUMBER_SMALL, compared to the skip offset utilized for larger block size (SKIP_NUMBER_NORMAL). With this approach, video encoder 200 and video decoder 300 may check the full length of the buffer for smaller block sizes, but access the data at a certain subsampling rate, thus with coarser granularity of the information stored in the history buffer.

2. In some examples, video encoder 200 and video decoder 300 may determine the motion vector prediction candidate from a history buffer, yet in other examples, this can be a motion information buffer produced not in the current picture but by another source, e.g., MV information collected in another frame, or another resolution level (e.g., in the case of multi-resolution scalable coding), view, slice, tile, or fragment of the coded picture.
3. In some examples, video encoder 200 and video decoder 300 may process the motion vector candidate prior to inclusion in the merge list e.g., by:
   a. MV rescaling, e.g., in the case of anot0her POC distance due to either different POC value of the collocated block, or difference in the reference picture index
   b. MV rescaling, in the case that the MVC is extracted from the buffer collected in another (not matching to the current picture) resolution level or picture.
   c. MV disparity offset/compensation or MV rescaling, due to the source of MV information being extracted from another view, e.g., in the case of the multi-view video data representation.

An example implementation of these techniques is described below, with certain changes relative to Enhanced Video Coding (EVC) represented in italics.

Derivation process for history-based merging candidates:
Inputs to this process are:
   a merge candidate list mergeCandList,
   the number of available merging candidates in the list numCurrMergeCand,
   history based motion information table HmvpCandList,
   the maximal number of elements mLSize within mergeCandList.
Outputs to this process are:
   the modified merging candidate list mergeCandList,
   the modified number of merging candidates in the list numCurrMergeCand.
The variable numOrigMergeCand is set equal to numCurrMergeCand. The variable hmvpStop is set to FALSE. The variable NumHmvpCand is set to the number of motion entries in HmvpCandList.
The variable maxNumCheckedHistory is set to be equal to (((NumHmvpCand+1)>>2)<<2)−1.
The variable SKIP_NUMBER is set to be equal (mLSize=4)? SKIP_NUMBER_SMALL: SKIP_NUMBER_NORMAL.
For each candidate in HmvpCandList with hMvpIdx=START, START+SKIP_NUMBER, . . . , min(maxNumCheckedHistory, (mLSize=4)? SIZE_SMALL: SIZE_NORMAL), the following ordered steps are repeated until hmvpStop is equal to TRUE.
1. The variable sameMotion is derived as follows:
   sameMotion is set to FALSE
   If HMVPCandList[NumHmvpCand−hMvpIdx] have the same motion vectors and the same reference indices with any mergeCandList[i] with i being 0 . . . numOrigMergeCand−1, sameMotion is set to TRUE
2. When sameMotion is equal to false, the candidate HmvpCandList[NumHmvpCand−hMvpIdx] is added to the merging candidate list as follows:
mergeCandList[numCurrMergeCand++]=HmvpCandList [NumHmvpCand−hMvpIdx] (8-303)
3. If numCurrMergeCand is equal to mLSize, hmvpStop is set to TRUE.

Figure 6:
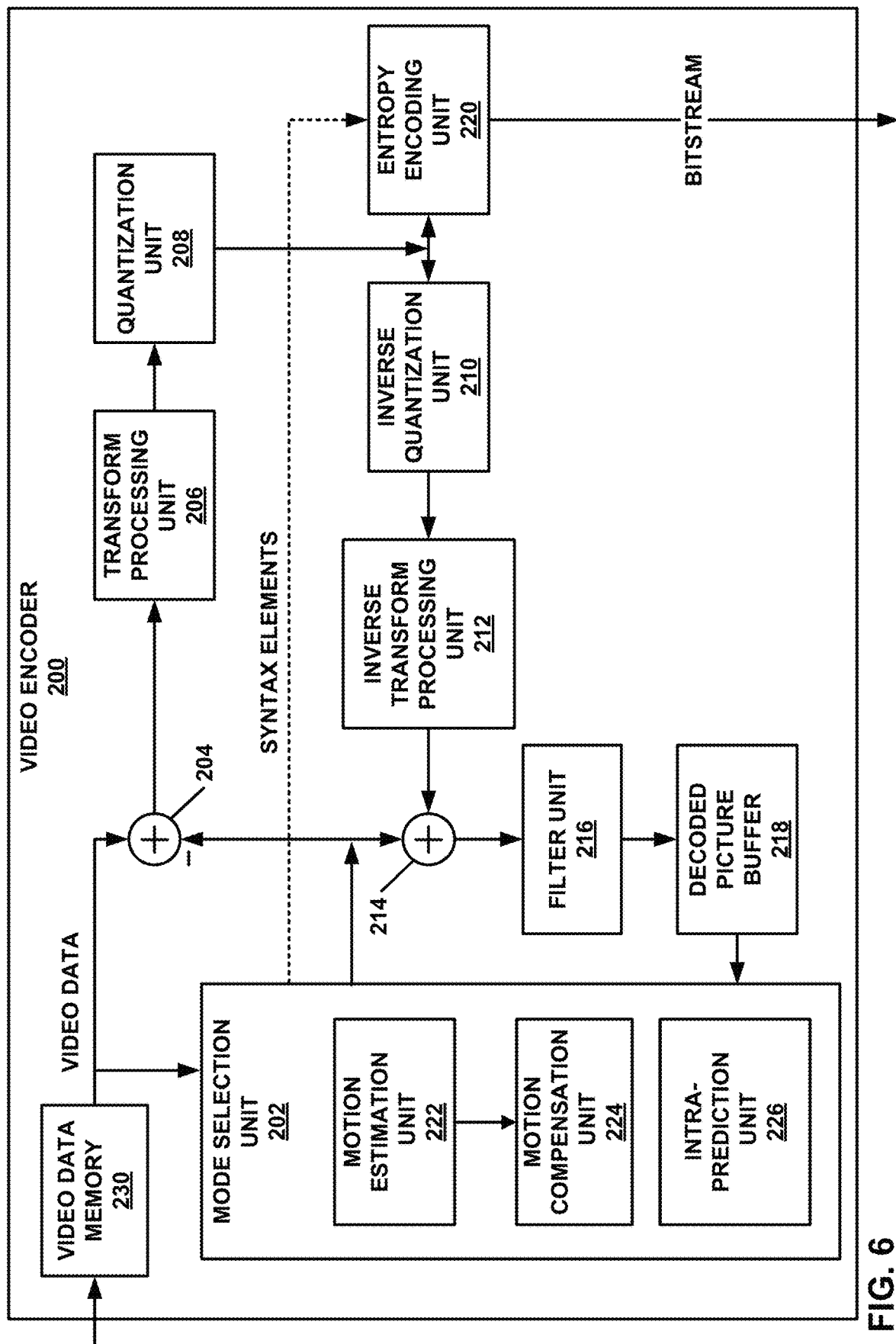
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 in the context of video coding standards such as the H.265/HEVC video coding standard and the H.266/VVC video coding standard in development. However, the techniques of this disclosure are not limited to these video coding standards, and are applicable generally to video encoding and decoding.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In the case that mode selection unit 202 select inter-prediction mode for the current block, video encoder 200 may further encode motion information, including the motion vector, for the current block. For example, entropy encoding unit 220 may entropy encode the motion information in merge mode or AMVP mode. In either merge mode or AMVP mode, entropy encoding unit 220 may determine a motion vector prediction candidate from a set of motion vector prediction candidates. In accordance with the techniques of this disclosure, entropy encoding unit 220 may construct the set of motion vector prediction candidates to have a number of candidates corresponding to a size of the current block.

In particular, in some examples, entropy encoding unit 220 may construct the set of motion vector prediction candidates to have a first number of candidates when the size of the current block is less than a threshold, and a second number of candidates when the size of the current block is greater than the threshold, where the second number is greater than the first number. In some examples, entropy encoding unit 220 may use a skip offset, determined according to the size of the current block, to skip a number of motion vector prediction candidates in order when constructing the set of motion vector prediction candidates. The skip offset may be larger for blocks smaller than the threshold than a skip offset for blocks larger than the threshold.

Entropy encoding unit 220 may further select one of the motion vector prediction candidates from the set of motion vector prediction candidates to use as a motion vector predictor, then encode the motion information of the current block using the selected motion vector predictor. In AMVP mode, entropy encoding unit 220 may further entropy encode motion vector difference information, a reference picture list indicator, and a reference picture index identifying a reference picture in the reference picture list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In accordance with the techniques of this disclosure, DPB 218 may include one or more history buffers for storing motion information of previously coded blocks. Thus, mode selection unit 202 may cause entropy encoding unit 220 to select a motion vector predictor from the motion information of the previously coded blocks of the history buffers. In accordance with the techniques of this disclosure, when a current block is smaller than a threshold size, mode selection unit 202 may reduce a number of motion vector prediction candidates from which to select the motion vector predictor, from a first number to a second number smaller than the first number.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that a size of a current block of the video data is less than a threshold, the current block being a two-dimensional array of samples representing a portion of a picture; determine a set of motion vector prediction candidates for the current block according to the determination that the size of the current block is less than the threshold; select a motion vector predictor of the motion vector prediction candidates for the current block; encode motion information of the current block using the motion vector predictor; and encode the current block using the motion information.

Figure 7:
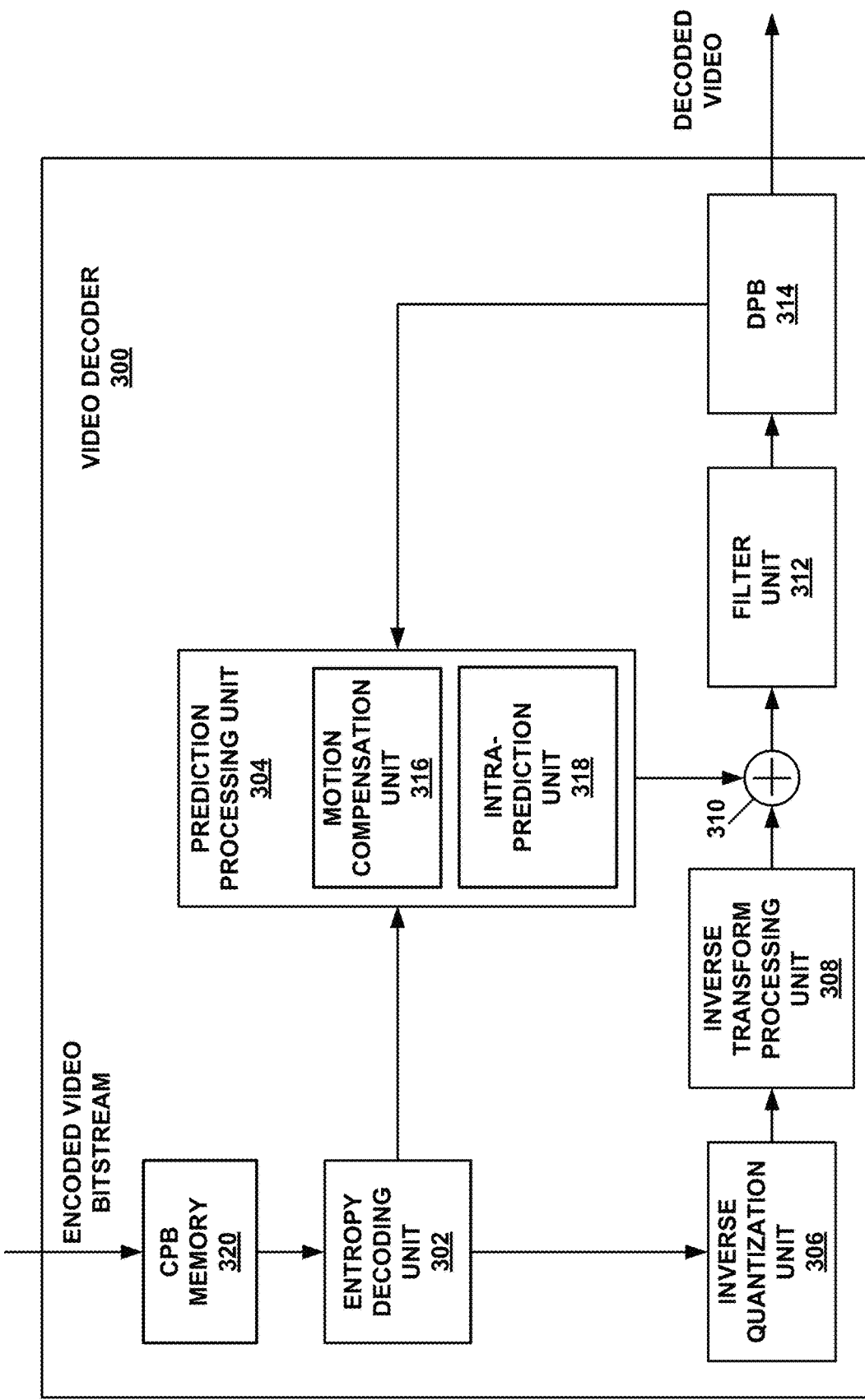
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

In the case that the decoded values of syntax elements of the current block indicate that the current block is predicted using inter-prediction mode, video decoder 300 may further decode motion information, including a motion vector, for the current block. For example, entropy decoding unit 302 may entropy decode the motion information in merge mode or AMVP mode, e.g., depending on the values of the syntax elements. In either merge mode or AMVP mode, entropy decoding unit 302 may determine a motion vector prediction candidate from a set of motion vector prediction candidates. In accordance with the techniques of this disclosure, entropy decoding unit 302 may construct the set of motion vector prediction candidates to have a number of candidates corresponding to a size of the current block.

In some examples, entropy decoding unit 302 may construct the set of motion vector prediction candidates to have a first number of candidates when the size of the current block is less than a threshold, and a second number of candidates when the size of the current block is greater than the threshold, where the second number is greater than the first number. In some examples, entropy decoding unit 302 may use a skip offset, determined according to the size of the current block, to skip a number of motion vector prediction candidates in order when constructing the set of motion vector prediction candidates. The skip offset may be larger for blocks smaller than the threshold than a skip offset for blocks larger than the threshold.

Entropy decoding unit 302 may further decode a motion vector prediction candidate index referring to one of the motion vector prediction candidates in the set of motion vector prediction candidates to use as a motion vector predictor, then decode the motion information of the current block using the selected motion vector predictor. In AMVP mode, entropy decoding unit 302 may further entropy decode motion vector difference information, a reference picture list indicator, and a reference picture index identifying a reference picture in the reference picture list.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

In accordance with the techniques of this disclosure, DPB 314 may include one or more history buffers for storing motion information of previously coded blocks. Thus, prediction processing unit 304 may cause motion compensation unit 316 to select a motion vector predictor from the motion information of the previously coded blocks. In accordance with the techniques of this disclosure, when a current block is smaller than a threshold size, prediction processing unit 304 may reduce a number of motion vector prediction candidates from which to select the motion vector predictor.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine that a size of a current block of the video data is less than a threshold, the current block being a two-dimensional array of samples representing a portion of a picture; determine a set of motion vector prediction candidates for the current block according to the determination that the size of the current block is less than the threshold; select a motion vector predictor of the motion vector prediction candidates for the current block; decode motion information of the current block using the motion vector predictor; and decode the current block using the motion information.

Figure 8:
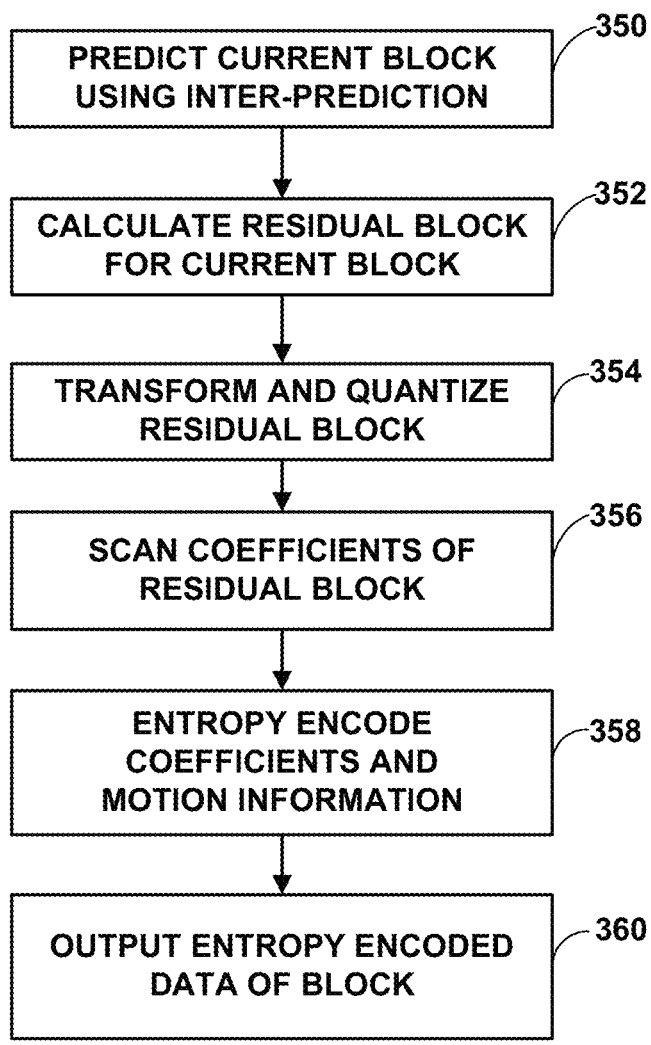
FIG. 8 is a flowchart illustrating an example method for encoding a current block in accordance with the techniques of this disclosure.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block using inter-prediction (350). For example, video encoder 200 may form a prediction block for the current block using motion information. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients and the motion information (358).

For example, video encoder 200 may determine whether a size of the current block is less than a threshold. If the size is greater than or equal to the threshold, video encoder 200 may select a first number of motion vector prediction candidates from which to ultimately select a motion vector predictor to encode the motion information for the current block, e.g., using merge or AMVP mode. If the size of the current block is less than the threshold, video encoder 200 may select a second, reduced number of motion vector prediction candidates, less than the first number of motion vector prediction candidates, from which to ultimately select a motion vector predictor to encode the motion information for the current block, e.g., using merge or AMVP mode. Video encoder 200 may encode the coefficients and motion information using CAVLC or CABAC. Video encoder 200 may then output the entropy encoded data of the block (360).

In this manner, the method of FIG. 8 represents an example of a method of encoding video data, including determining that a size of a current block of the video data is less than a threshold, the current block being a two-dimensional array of samples representing a portion of a picture; determining a set of motion vector prediction candidates for the current block according to the determination that the size of the current block is less than the threshold; selecting a motion vector predictor of the motion vector prediction candidates for the current block; encoding motion information of the current block using the motion vector predictor; and encoding the current block using the motion information.

Figure 9:
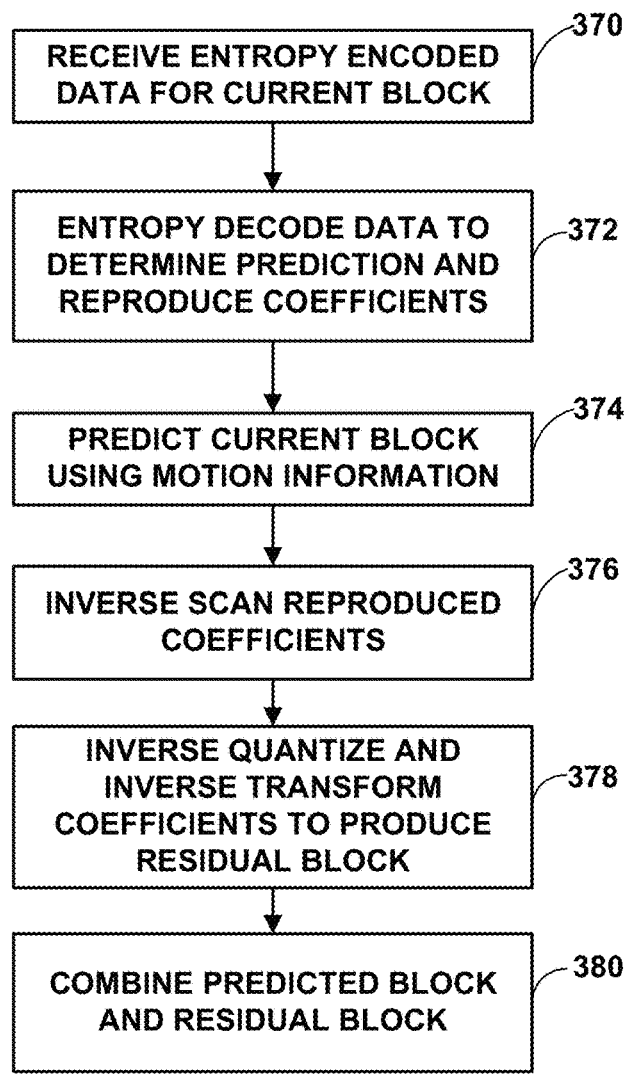
FIG. 9 is a flowchart illustrating an example method for decoding a current block in accordance with the techniques of this disclosure.

FIG. 9 is a flowchart illustrating an example method for decoding a current block in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block (370), such as entropy encoded prediction information and entropy encoded data for coefficients of a residual block corresponding to the current block. Video decoder 300 may entropy decode the entropy encoded data to determine the prediction information for the current block and to reproduce coefficients of the residual block (372). For example, video decoder 300 may determine whether a size of the current block is less than a threshold. If the size of the current block is less than the threshold, video decoder 300 may select a reduced number of motion vector prediction candidates from which to ultimately select a motion vector predictor to decode the motion information for the current block, e.g., using merge or AMVP mode.

Video decoder 300 may predict the current block (374), e.g., using the motion information in inter-prediction mode, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 9 represents an example of a method including determining that a size of a current block of the video data is less than a threshold, the current block being a two-dimensional array of samples representing a portion of a picture; determining a set of motion vector prediction candidates for the current block according to the determination that the size of the current block is less than the threshold; selecting a motion vector predictor of the motion vector prediction candidates for the current block; decoding motion information of the current block using the motion vector predictor; and decoding the current block using the motion information.

Figure 10:
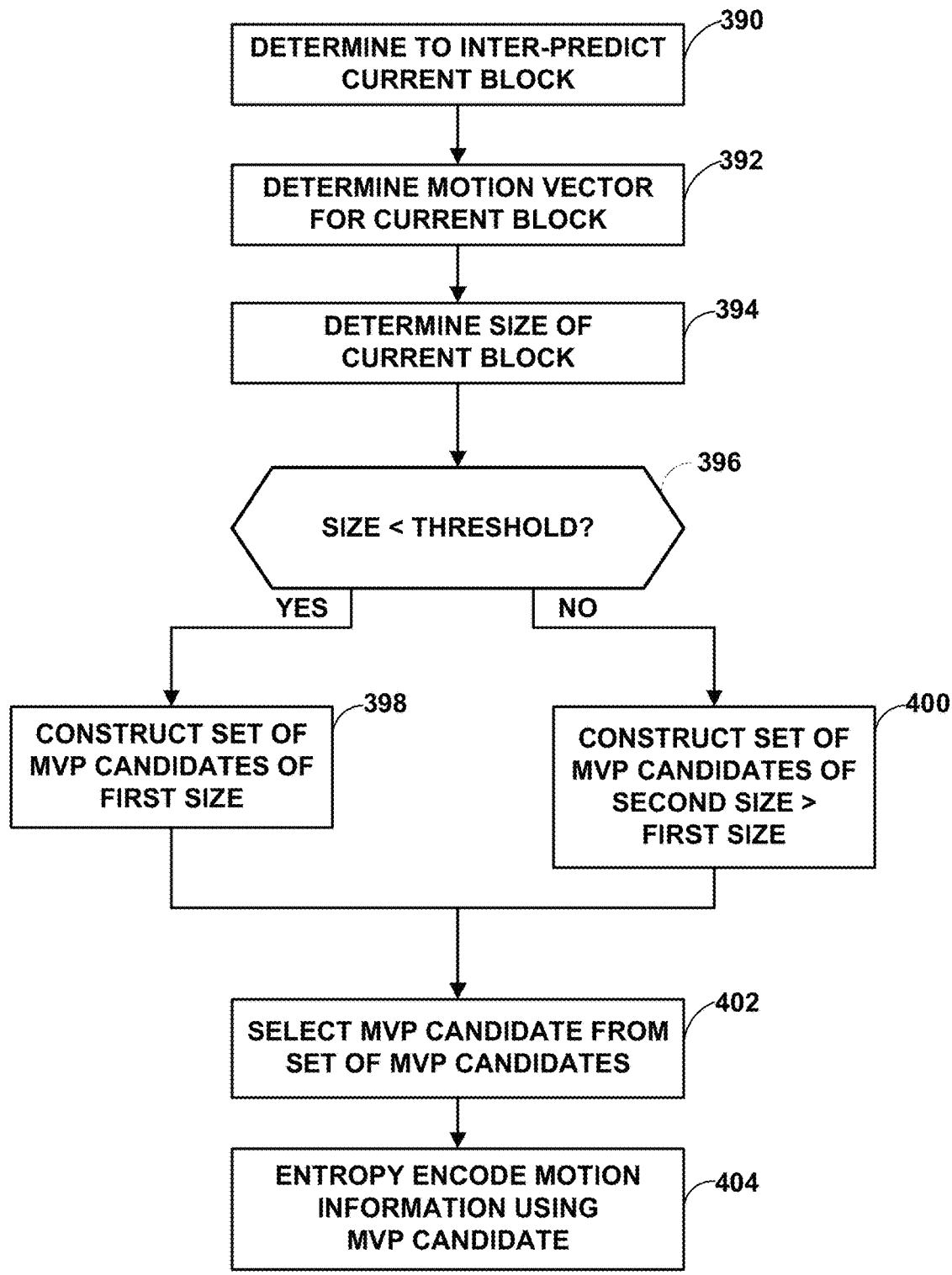
FIG. 10 is a flowchart illustrating an example method for encoding video data according to the techniques of this disclosure.

FIG. 10 is a flowchart illustrating an example method for encoding video data according to the techniques of this disclosure. Although described with respect to video encoder 200 (FIGS. 1 and 6), it should be understood that other devices may be configured to perform a method similar to that of FIG. 10.

Initially, mode selection unit 202 of video encoder 200 may determine to inter-predict a current block of video data (390). For example, mode selection unit 202 may perform a rate-distortion optimization (RDO) process to compare rate-distortion values for a variety of prediction modes, block sizes, and other encoding parameters to ultimately determine that the current block is to be predicted using inter-prediction mode. During the RDO process, mode selection unit 202 may also cause motion estimation unit 222 to determine a motion vector for the current block (392) and mode selection unit 202 may determine a size of the current block (394).

Mode selection unit 202 may provide the motion vector and other prediction information for the block, such as motion information and block size, to entropy encoding unit 220. Entropy encoding unit 220 may determine whether the size of the current block is less than a threshold (396). If the size of the current block is less than the threshold ("YES" branch of 396), entropy encoding unit 220 may construct a set of motion vector prediction (MVP) candidates of a first size (398). If the size of the current block is not less than the threshold ("NO" branch of 396), e.g., is greater than or equal to the threshold, entropy encoding unit 220 may construct a set of MVP candidates of a second size, the second size being greater than the first size (400).

To construct the sets of MVP candidates, entropy encoding unit 220 may be configured to select a first skip offset when the size of the current block is less than the threshold, and a second skip offset when the size of the current block is greater than or equal to the threshold. Entropy encoding unit 220 may construct the set of MVP candidates by adding neighboring candidates to the set of MVP candidates in the order specified with respect to, e.g., FIG. 5B or 5C, but may skip a number of candidates between additions equal to the determined skip offset.

After constructing the set of MVP candidates, entropy encoding unit 220 may select one of the MVP candidates from the set of MVP candidates (402). Entropy encoding unit 220 may then entropy encode the motion information of the current block, including the determined motion vector, using the MVP candidate (404). For example, entropy encoding unit 220 may entropy encode a merge candidate index for merge mode, or an AMVP candidate index, motion vector difference data, a reference picture list identifier, and a reference picture list index in AMVP mode.

In this manner, the method of FIG. 10 represents an example of a method of encoding video data, including determining that a size of a current block of the video data is less than a threshold, the current block being a two-dimensional array of samples representing a portion of a picture; determining a set of motion vector prediction candidates for the current block according to the determination that the size of the current block is less than the threshold; selecting a motion vector predictor of the motion vector prediction candidates for the current block; encoding motion information of the current block using the motion vector predictor; and encoding the current block using the motion information.

Figure 11:
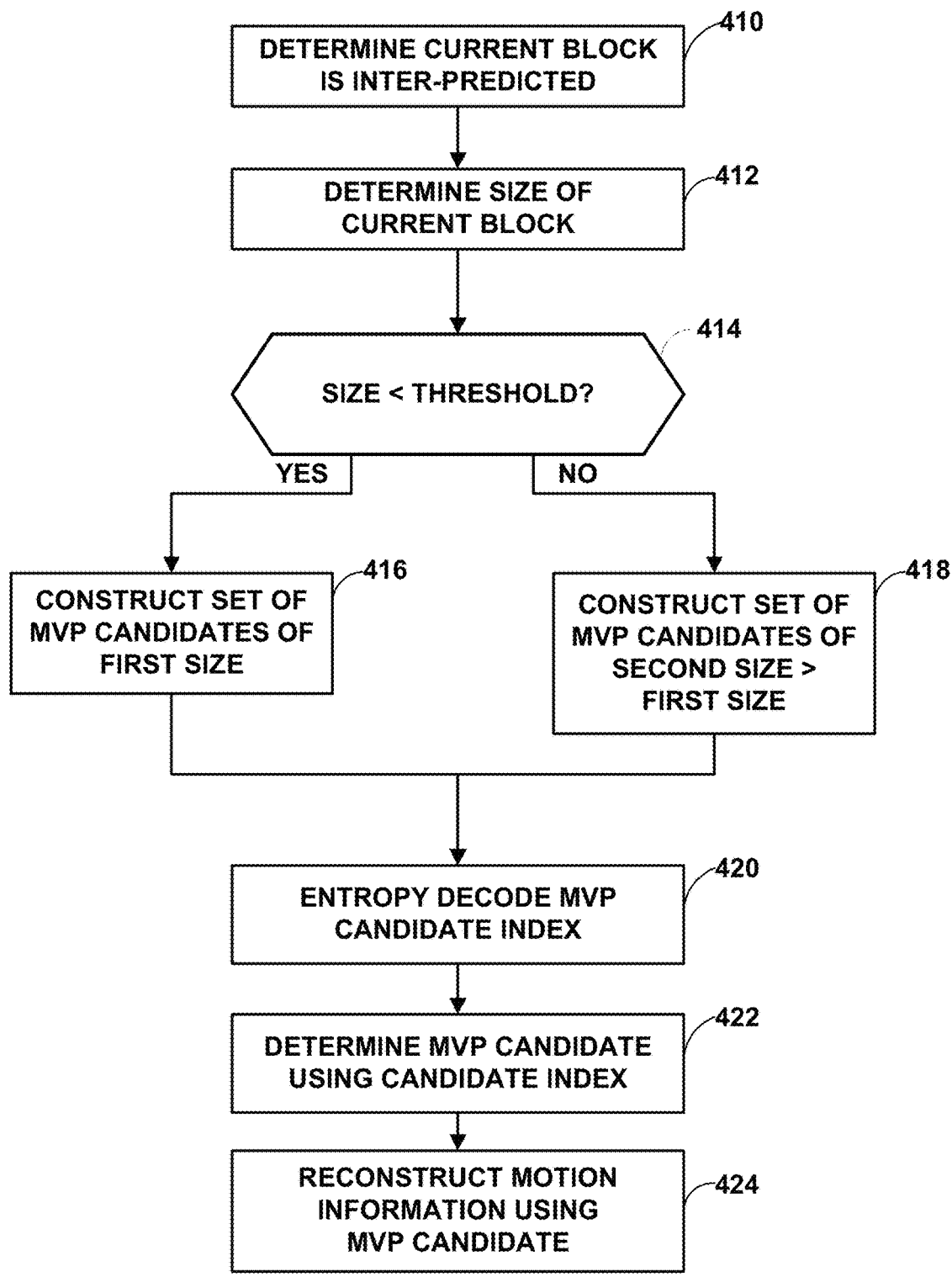
FIG. 11 is a flowchart illustrating an example method for decoding video data according to the techniques of this disclosure.

FIG. 11 is a flowchart illustrating an example method for decoding video data according to the techniques of this disclosure. Although described with respect to video decoder 300 (FIGS. 1 and 7), it should be understood that other devices may be configured to perform a method similar to that of FIG. 11.

Initially, entropy decoding unit 302 of video decoder 300 may determine entropy decode values for syntax elements indicating that a current block of video data is inter-predicted (410). Entropy decoding unit 302 may also entropy decode values for syntax elements indicating a size of the current block (412). Entropy decoding unit 302 may then determine whether the size of the current block is less than a threshold (414). If the size of the current block is less than the threshold ("YES" branch of 414), entropy decoding unit 302 may construct a set of motion vector prediction (MVP) candidates of a first size (416). If the size of the current block is not less than the threshold ("NO" branch of 414), e.g., is greater than or equal to the threshold, entropy decoding unit 302 may construct a set of MVP candidates of a second size, the second size being greater than the first size (418).

To construct the sets of MVP candidates, entropy decoding unit 302 may be configured to select a first skip offset when the size of the current block is less than the threshold, and a second skip offset when the size of the current block is greater than or equal to the threshold. Entropy decoding unit 302 may construct the set of MVP candidates by adding neighboring candidates to the set of MVP candidates in the order specified with respect to, e.g., FIG. 5B or 5C, but may skip a number of candidates between additions equal to the determined skip offset.

Entropy decoding unit 302 may also entropy decode an MVP candidate index into the set of MVP candidates (420). Entropy decoding unit 302 may determine one of the set of MVP candidates using the MVP candidate index (422) (i.e., identified by the MVP candidate index) as an MVP candidate to be used to decode motion information for the current block. Entropy decoding unit 302 may then decode and reconstruct the motion information using the MVP candidate (424). For example, for merge mode, entropy decoding unit 302 may provide the motion vector to motion compensation unit 316. For AMVP mode, entropy decoding unit 302 may further decode motion vector difference data, a reference picture index, and a reference picture list, and provide this information to motion compensation unit 316.

In this manner, the method of FIG. 11 represents an example of a method of decoding video data, including determining that a size of a current block of the video data is less than a threshold, the current block being a two-dimensional array of samples representing a portion of a picture; determining a set of motion vector prediction candidates for the current block according to the determination that the size of the current block is less than the threshold; selecting a motion vector predictor of the motion vector prediction candidates for the current block; decoding motion information of the current block using the motion vector predictor; and decoding the current block using the motion information.

Various techniques of this disclosure are summarized in the following examples:

Example 1: A method of coding video data, the method comprising: determining that a size of a current block of the video data is less than a threshold; determining a set of motion vector prediction candidates for the current block according to the determination that the size of the current block is less than the threshold; selecting a motion vector predictor of the motion vector prediction candidates for the current block; coding motion information of the current block using the motion vector predictor; and coding the current block using the motion information.

Example 2: The method of example 1, wherein determining the set of motion vector prediction candidates comprises determining a number of candidates to include in the set of motion vector prediction candidates according to the determination that the size of the current block is less than the threshold.

Example 3: The method of example 2, wherein the number of candidates is smaller than a number of candidates to include in a set of motion vector prediction candidates for blocks having sizes greater than the threshold.

Example 4: The method of any of examples 1-3, wherein the current block comprises a first block, the size of the first block comprises a first size, the motion vector predictor comprises a first motion vector predictor, and the set of motion vector prediction candidates comprises a first set of motion vector prediction candidates having a first number of motion vector prediction candidates, the method further comprising: determining that a second size of a second block of the video data is greater than the threshold; determining a second set of motion vector prediction candidates for the second block according to the determination that the second size of the second block is greater than the threshold, the second set having a second number of motion vector prediction candidates, the second number being larger than the first number; and coding motion information of the second block using the second motion vector predictor.

Example 5: The method of any of examples 1-4, wherein determining the set of motion vector prediction candidates comprises selecting the motion vector prediction candidates from a close-area neighborhood to the current block.

Example 6: The method of any of examples 1-4, wherein determining the set of motion vector prediction candidates comprises subsampling history buffer information according to a skip offset, the skip offset being determined according to the determination that the size of the block is less than the threshold.

Example 7: The method of any of examples 1-6, wherein determining the set of motion vector prediction candidates comprises selecting the set of motion prediction candidates from a motion information buffer produced from a source other than a current picture including the current block.

Example 8: The method of example 7, further comprising producing the motion information buffer from motion information collected from a picture other than the current picture, a different resolution level, a different view, a different slice, a different tile, or a different fragment.

Example 9: The method of any of examples 1-8, wherein determining the set of motion vector prediction candidates comprises: modifying motion information of a neighboring block; and adding the modified motion information to the set of motion vector prediction candidates.

Example 10: The method of example 9, wherein modifying the motion information comprises scaling a motion vector of the motion information.

Example 11: The method of example 10, wherein scaling comprises scaling the motion vector to account for picture order count (POC) differences between a current picture including the current block, a reference picture for the motion information of the current block, and a reference picture for the motion information of the neighboring block.

Example 12: The method of example 10, wherein scaling comprises scaling the motion vector according to a buffer including the motion information of the neighboring block.

Example 13: The method of example 12, wherein the buffer stores motion information for one of a different resolution level, a different picture, or a different view.

Example 14: The method of any of examples 1-13, wherein coding the current block comprises decoding the current block, comprising: forming a prediction block for the current block using the motion information; decoding a residual block for the current block; and combining the prediction block with the residual block to reproduce the current block.

Example 15: The method of any of examples 1-14, wherein coding the current block comprises decoding the current block, comprising: forming a prediction block for the current block using the motion information; subtracting the prediction block from the current block to produce a residual block for the current block; and encoding the residual block.

Example 16: A device for coding video data, the device comprising one or more means for performing the method of any of examples 1-15.

Example 17: The device of example 16, wherein the one or more means comprise one or more processors implemented in circuitry.

Example 18: The device of example 16, further comprising a display configured to display the video data.

Example 19: The device of example 16, wherein the device comprises one or more of a camera, a computer, a mobile device, a broadcast receiver device, or a set-top box.

Example 20: The device of example 16, further comprising a memory configured to store the video data.

Example 21: The device of example 16, further comprising a camera configured to capture the video data.

Example 22: The device of example 16, wherein the device comprises at least one of: an integrated circuit; a microprocessor; or a wireless communication device.

Example 23: A computer-readable storage medium having stored thereon instructions that, when executed, cause a processor to perform the method of any of examples 1-15.

Example 24: A device for decoding video data, the device comprising: means for determining that a size of a current block of the video data is less than a threshold; means for determining a set of motion vector prediction candidates for the current block according to the determination that the size of the current block is less than the threshold; means for selecting a motion vector predictor of the motion vector prediction candidates for the current block; means for coding motion information of the current block using the motion vector predictor; and means for coding the current block using the motion information.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining that a size of a current block of the video data is less than a threshold, the current block being a two-dimensional array of samples representing a portion of a picture;
   determining a set of motion vector prediction candidates for the current block according to the determination that the size of the current block is less than the threshold, including determining a number of candidates to include in the set of motion vector prediction candidates according to the determination that the size of the current block is less than the threshold, wherein the number of candidates is smaller than a second number of candidates to include in a set of motion vector prediction candidates for blocks having sizes greater than the threshold;
   selecting a motion vector predictor of the motion vector prediction candidates for the current block;
   coding motion information of the current block using the motion vector predictor; and
   coding the current block using the motion information.

2. The method of claim 1, wherein determining that the size of the current block is less than the threshold comprises determining that the current block has a width of 4 samples or a height of 4 samples.

3. The method of claim 1, wherein the current block comprises a first block, the size of the first block comprises a first size, the motion vector predictor comprises a first motion vector predictor, and the set of motion vector prediction candidates comprises a first set of motion vector prediction candidates having a first number of motion vector prediction candidates, the method further comprising:

determining that a second size of a second block of the video data is greater than the threshold;

determining a second set of motion vector prediction candidates for the second block according to the determination that the second size of the second block is greater than the threshold, the second set having the second number of motion vector prediction candidates; and coding motion information of the second block using the second motion vector predictor.

4. The method of claim 1, wherein determining the set of motion vector prediction candidates comprises selecting the motion vector prediction candidates from a close-area neighborhood to the current block.

5. The method of claim 1, wherein determining the set of motion vector prediction candidates comprises subsampling history buffer information according to a skip offset, the skip offset being determined according to the determination that the size of the block is less than the threshold.

6. The method of claim 5, further comprising, in response to the determination that the size of the block is less than the threshold, determining the skip offset to be larger than a skip offset determined for blocks having sizes greater than the threshold.

7. The method of claim 1, wherein determining the set of motion vector prediction candidates comprises selecting the set of motion prediction candidates from a motion information buffer produced from a source other than a current picture including the current block.

8. The method of claim 7, further comprising producing the motion information buffer from motion information collected from a picture other than the current picture, a different resolution level, a different view, a different slice, a different tile, or a different fragment.

9. The method of claim 1, wherein determining the set of motion vector prediction candidates comprises:

modifying motion information of a neighboring block; and adding the modified motion information to the set of motion vector prediction candidates.

10. The method of claim 9, wherein modifying the motion information comprises scaling a motion vector of the motion information.

11. The method of claim 10, wherein scaling comprises scaling the motion vector according to a buffer including the motion information of the neighboring block.

12. The method of claim 11, wherein the buffer stores motion information for one of a different resolution level, a different picture, or a different view.

13. The method of claim 10, wherein scaling comprises scaling the motion vector to account for picture order count (POC) differences between a current picture including the current block, a reference picture for the motion information of the current block, and a reference picture for the motion information of the neighboring block.

14. The method of claim 1, wherein coding the current block comprises decoding the current block, comprising:

forming a prediction block for the current block using the motion information;

decoding a residual block for the current block; and combining the prediction block with the residual block to reproduce the current block.

15. The method of claim 1, wherein coding the current block comprises encoding the current block, comprising:

forming a prediction block for the current block using the motion information;

subtracting the prediction block from the current block to produce a residual block for the current block; and encoding the residual block.

16. The method of claim 1, wherein determining the set of motion vector prediction candidates for the current block comprises:

forming an initial merge candidate list for the current block;

determining a number of historical motion vector predictor candidates to check for redundancies with the initial merge candidate list and to add to the initial merge candidate list according to the determination that the size of the current block is less than the threshold; and adding one or more of the historical motion vector predictor candidates to the initial merge candidate list when the one or more of the historical motion vector predictor candidates are determined not to be redundant with the initial merge candidate list to form the set of motion vector prediction candidates.

17. The method of claim 1, wherein the number of candidates is equal to 15, and the second number of candidates is equal to 23.

18. A device for coding video data, the device comprising:

a memory configured to store video data; and one or more processors implemented in circuitry and configured to:

determine that a size of a current block of the video data is less than a threshold, the current block being a two-dimensional array of samples representing a portion of a picture;

determine a set of motion vector prediction candidates for the current block according to the determination that the size of the current block is less than the threshold, wherein the one or more processors are configured to determine a number of candidates to include in the set of motion vector prediction candidates according to the determination that the size of the current block is less than the threshold, wherein the number of candidates is smaller than a second number of candidates to include in a set of motion vector prediction candidates for blocks having sizes greater than the threshold;

select a motion vector predictor of the motion vector prediction candidates for the current block;

code motion information of the current block using the motion vector predictor; and code the current block using the motion information.

19. The device of claim 18, to determine that the size of the current block is less than the threshold, the one or more processors are configured to determine that the current block has a width of 4 samples or a height of 4 samples.

20. The device of claim 18, wherein the current block comprises a first block, the size of the first block comprises a first size, the motion vector predictor comprises a first motion vector predictor, the set of motion vector prediction candidates comprises a first set of motion vector prediction candidates having a first number of motion vector prediction candidates, and the one or more processors are further configured to:

determine that a second size of a second block of the video data is greater than the threshold;

determine a second set of motion vector prediction candidates for the second block according to the determination that the second size of the second block is greater than the threshold, the second set having the second number of motion vector prediction candidates; and code motion information of the second block using the second motion vector predictor.

21. The device of claim 18, wherein the one or more processors are configured to:
in response to the determination that the size of the block is less than the threshold, determine a skip offset, the skip offset being larger than a skip offset determined for blocks having sizes greater than the threshold; and
subsample history buffer information according to the skip offset to determine the set of motion vector prediction candidates.

22. The device of claim 18, wherein to code the current block, the one or more processors are configured to:
form a prediction block for the current block using the motion information;
decode a residual block for the current block; and
combine the prediction block with the residual block to reproduce the current block.

23. The device of claim 18, wherein to code the current block, the one or more processors are configured to:
form a prediction block for the current block using the motion information;
subtract the prediction block from the current block to produce a residual block for the current block; and
encode the residual block.

24. The device of claim 18, further comprising a display configured to display the video data.

25. The device of claim 18, wherein the device comprises one or more of a camera, a computer, a mobile device, a broadcast receiver device, a set-top box, an integrated circuit, a microprocessor, or a wireless communication device.

26. The device of claim 18, further comprising a camera configured to capture the video data.

27. The device of claim 18, wherein to determine the set of motion vector prediction candidates for the current block, the one or more processors are configured to:
form an initial merge candidate list for the current block;
determine a number of historical motion vector predictor candidates to check for redundancies with the initial merge candidate list and to add to the initial merge candidate list according to the determination that the size of the current block is less than the threshold; and
add one or more of the historical motion vector predictor candidates to the initial merge candidate list when the one or more of the historical motion vector predictor candidates are determined not to be redundant with the initial merge candidate list to form the set of motion vector prediction candidates.

28. The device of claim 18, wherein the number of candidates is equal to 15, and the second number of candidates is equal to 23.

29. A non-transitory computer-readable storage medium having stored thereon instructions that, when executed, cause a processor to:
determine that a size of a current block of video data is less than a threshold, the current block being a two-dimensional array of samples representing a portion of a picture;
determine a set of motion vector prediction candidates for the current block according to the determination that the size of the current block is less than the threshold, including instructions that cause the processor to determine a number of candidates to include in the set of motion vector prediction candidates according to the determination that the size of the current block is less than the threshold, wherein the number of candidates is smaller than a second number of candidates to include in a set of motion vector prediction candidates for blocks having sizes greater than the threshold;
select a motion vector predictor of the motion vector prediction candidates for the current block;
code motion information of the current block using the motion vector predictor; and
code the current block using the motion information.

30. The non-transitory computer-readable storage medium of claim 29, wherein the number of candidates is equal to 15, and the second number of candidates is equal to 23.

* * * * *